(No Model.)  2 Sheets—Sheet 1.
W. P. CANNING.
STOP MOTION MECHANISM FOR MACHINES FOR PREPARING SLIVER.
No. 550,250.  Patented Nov. 26, 1895.
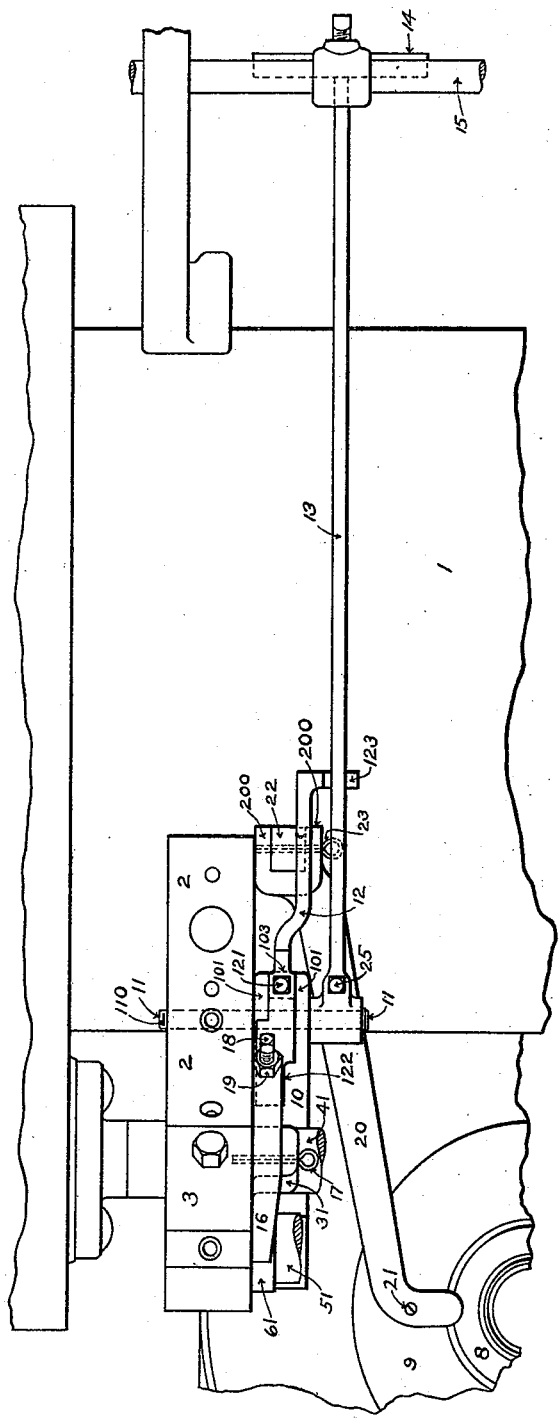
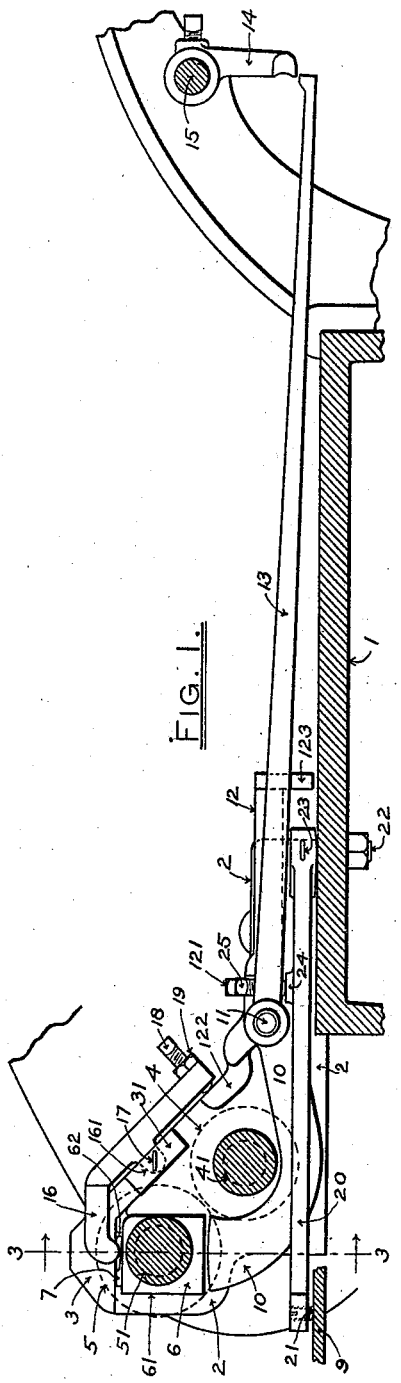
WITNESSES.
Channing Whitaker.
Saml. G. Stephens.
INVENTOR.
William P. Canning.

(No Model.) 2 Sheets—Sheet 2.

W. P. CANNING.
STOP MOTION MECHANISM FOR MACHINES FOR PREPARING SLIVER.

No. 550,250. Patented Nov. 26, 1895.

WITNESSES.
Channing Whitaker.
Saml. G. Stephens.

INVENTOR.
William P. Canning.

UNITED STATES PATENT OFFICE.

WILLIAM P. CANNING, OF LOWELL, MASSACHUSETTS, ASSIGNOR TO THE LOWELL MACHINE SHOP, OF SAME PLACE.

STOP-MOTION MECHANISM FOR MACHINES FOR PREPARING SLIVER.

SPECIFICATION forming part of Letters Patent No. 550,250, dated November 26, 1895.

Application filed June 19, 1895. Serial No. 553,255. (No model.)

*To all whom it may concern:*

Be it known that I, WILLIAM PITT CANNING, a citizen of the United States, residing at Lowell, in the county of Middlesex and Commonwealth of Massachusetts, have invented certain new and useful Improvements in Stop-Motion Mechanisms for Machines for Preparing Sliver, of which the following is a specification, reference being had therein to the accompanying drawings.

The invention has for its object to provide a stop-motion mechanism of novel and improved character intended to co-operate with the calender-rolls and coiler of a machine for preparing sliver and adapted to act whenever an excessive thickness or enlargement presents itself in the sliver, or the latter breaks, runs out, or becomes unduly attenuated, and also when the can becomes filled.

The invention consists in certain features of novel construction and combination, all as hereinafter is explained fully with reference to the accompanying drawings, and as afterward is more particularly pointed out and distinctly defined in the claims at the close of this specification.

Figure 3:
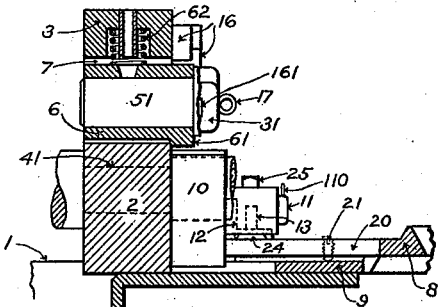
Figure 5:
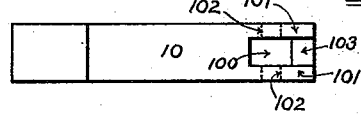
Figure 7:
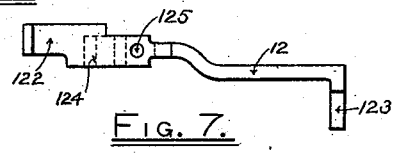

In the drawings, Figure 1, Sheet 1, is a view of portion of a railway drawing-head having my invention applied thereto, certain of the usual parts of the drawing-head being shown in vertical section, while the features of the invention are in side elevation. Fig. 2, Sheet 1, shows in plan the parts which are represented in Fig. 1, a greater portion of the coiler devices being illustrated. Fig. 3, Sheet 2, is a view in vertical section on the plane indicated by the line 3 3 in Fig. 1. In Figs. 1, 2, and 3 I have represented only so much of a railway drawing-head as is necessary in order to make clear the application and working of the parts which are involved in my invention. Figs. 4 to 11, Sheet 2, are views showing details which are described hereinafter.

At 1 is shown part of the frame of a railway drawing-head. At 2 is one of the brackets or stands which are secured to the said frame and serve for the support of the calender-rolls. At 3 is a cap applied to the said bracket or stand, and covering the recess or slot that is made therein for the reception of the movable bearing for one of the calender-rolls. At 4 and 5 are represented by dotted circles the peripheries of the two calender-rolls. At 6 is the bearing for the calender-roll 5. At 62 is the spring, which is interposed between the cap 3 and the said bearing 6. At 7 is the slot that is made in the bracket or stand 2 for the reception of the said bearing, and at 41 51, respectively, are the journals of the respective calender-rolls. As customary, the periphery of the roll 5 rests upon that of the roll 4, and the plane passing through the axes of the two rolls is inclined with relation to the vertical. At 8 is shown the top of the coiler-tunnel, and at 9 is the plate which surrounds said top. The foregoing parts are all common to drawing-frames now in use, and may be of any preferred character and construction.

Figure 4:
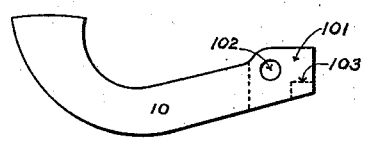
Figure 6:
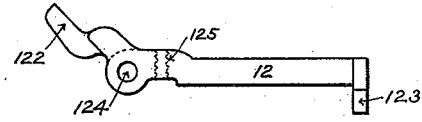
Figure 9:

At 10 is a lever which is mounted pivotally upon a pin 11, that is applied to the bracket or stand 2, the forward arm of the said lever extending beneath the roll 4 and its upturned end occupying a position closely adjacent to the journal portion 51 of the roll 5 or to the bearing 6 therefor. In the descent of the calender-roll 5, which is pemitted by a diminution in the thickness of the sliver passing between the rolls 4 and 5 or by the absence of sliver, the said upturned end of lever 10 is engaged and the said lever thereby is swung upon its pivotal center. Preferably the end of the lever is arranged in position to coact with the bearing 6, in order to avoid the wear of the roll 5, which would result if the said end engaged therewith. Fig. 4, Sheet 2, shows the lever 10 in side elevation, and Fig. 5, Sheet 2, shows the same in plan. The rear arm of the said lever is slotted vertically, as at 100, and through the side portions 101 101 are drilled holes 102 102 for the reception of the pin 11. The said side portions are connected by a cross-piece or tie 103. At 12 is a second lever which also is mounted pivotally upon the pin 11. The said lever 12 is shown separately in side elevation in Fig. 6, Sheet 2, and in plan in Fig. 7, Sheet 2. The lever 12 is formed with a hole 124 therethrough to receive the pin 11, and through a threaded hole 125 in said lever passes a set-screw 121, the tip of which rests upon the cross-piece or tie 103 of the lever 10. The free extremity of the rearwardly-extending arm of the lever 12 has a lateral projection 123, which extends under and supports the striker-engaging arm 13, the latter being mounted upon the pin 11.

At 14 is shown a striker for coaction with arm 13, and at 15 is the striker-shaft. The said shaft is oscillated in usual manner by devices of the character ordinarily employed in the like connection, the said devices being constructed and arranged in well-known manner, so that when the motion of the striker and striker-shaft is arrested by the arm 13 the driving connections of the machine shall be shipped and the machine shall be stopped. Normally the engaging portion of the arm 13, which is at the rear extremity thereof, occupies a position below the path of movement of the striker, as shown in Fig. 1. When, however, the calender-roll 5 is permitted to descend so far that its bearing 6 engages the adjacent rounded upper surface of the end of the forwardly-extending arm of lever 10 and depresses the said end and raises the rear arm of said lever, the tie or cross-piece 103 carries upward the lever 12, which in turn, by means of lateral projection 123, raises the arm 13 into the path of the striker. Thereupon the striker in its forward movement will engage the said rear end of arm 13 and be arrested thereby. Thus the machine will be stopped whenever the sliver passing between the calender-rolls diminishes in thickness below the predetermined extent or becomes discontinued. This extent may be varied, as desired, by making proper adjustment of the set-screw 121.

At 16 is a lever which is pivotally mounted upon the cap 3. The said lever is shown separately in side elevation in Fig. 8, Sheet 2, and in plan in Fig. 9, Sheet 2. It is formed with a downwardly-projecting lug 161, which is received in a recess that is formed in the lug 31, projecting laterally from cap 3, as indicated in Figs. 1 and 2. A pin 17, passed through a hole 162 in said projecting lug 161, constitutes the pivot for the said lever. The forward arm of this lever overhangs the bearing 6, or, if desired, it might overhang the journal portion 51 of roll 5. The former arrangement is preferred, however, inasmuch as it obviates the wear which would result from engagement of the said lever end with a rotating portion of roll 5. When the said roll 5 is raised beyond a predetermined extent in consequence of the passage of an unduly enlarged portion of sliver between the rolls 4 and 5 or in case of a roll-up on either of the rolls 4 and 5, the bearing 6 engages the end of the forward arm of lever 16 and causes the latter to turn on its pivot. Through the rear end of the lever 16 a set-screw 18 is passed, the stem of the said set-screw fitting a threaded hole in the lever 16, and its tip projects below the said lever and engages with the upwardly and forwardly projecting arm 122, which forms part of the lever 12. The set-screw 18 may be turned as required for varying the extent to which its tip projects from the lever, and it is secured from accidental movement by the check-nut 19. Through the medium of lever 16 and its set-screw 18 the lever 12 is turned whenever an undue enlargement in the sliver passes between the calender-rolls or a roll-up occurs on either of the said rolls, and thereby the arm 13 is caused to engage with the striker to stop the machine.

Figure 11:
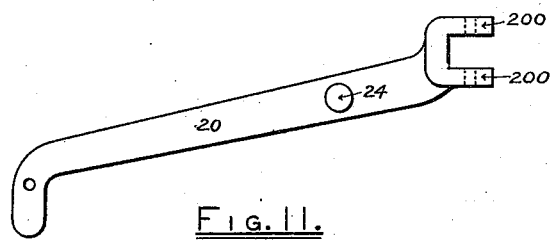
Figure 8:
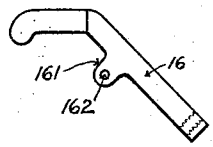
Figure 10:
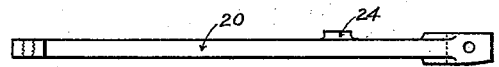

An arm 20 projects forwardly over the plate 9 and coiler-tunnel 8 into position to be engaged and raised by the latter whenever the coiler is lifted by the accumulation of sliver in a full can. A set-screw passing through the arm 20 rests on the surface of plate 9 and determines the position normally occupied by the said arm 20 and the distance which the coiler must rise before the arm 20 becomes engaged by the coiler-tunnel. The arm 20 is shown separately in side elevation in Fig. 10 and in plan in Fig. 11. The rear end of said arm is forked, as shown in Fig. 11, and the side portions 200 200 thereof fit upon opposite sides of the block or lug 22 on the frame 1, the arm 20 being connected with the said block or lug by a pin 23 passing through the said side portions 200 200 and the block or lug, as indicated in Fig. 2. On arm 20 is provided a seat 24 for coaction with the end of a set-screw 25, which passes through the arm 13. When the coiler-tunnel becomes raised by an accumulation of sliver in a full can beneath the coiler, so as to engage and lift the arm 20, the latter in turn engages the set-screw 25 and swings the arm 13 into position to engage with the striker 14, thus occasioning the stoppage of the machine. Thus through the instrumentalities described the arm 13 is placed in position to engage with the striker whenever the sliver passing between the calender-rolls becomes unduly attenuated, breaks, or runs out, also whenever an undue enlargement occurs in the sliver, also whenever a roll-up occurs on either of the calender-rolls, also when the can becomes full and should be replaced by another. As will be understood, the set-screws 18 121 serve to regulate or determine the extent of the movement of the movable calender-roll which shall occasion engagement of the striker-arresting device with the striker.

What I claim is—

1. The combination with a pair of calender-rolls, a striker, and a striker-arresting device, of a lever 10 operated by the movement of one of said calender-rolls toward the other, the lever 16 operated by the movement of said roll from the other, and the lever 12 which is actuated by each of the said levers independently and controls the position of the striker-arresting device, substantially as described.

2. The combination with a pair of calender-rolls, a striker, and a striker-arresting device, of a lever 10 operated by the movement of one of said calender-rolls toward the other, the lever 16 operated by the movement of said roll from the other, the lever 12 which is actuated by each of the said levers independently and controls the position of the striker-arresting device, and set-screws 18 and 121 whereby to determine the extent of the movement of the movable calender-roll which shall occasion engagement of the striker-arresting device with the striker, substantially as described.

3. The combination with a pair of calender-rolls, a striker, and a striker-arresting device, of a lever 10 operated by the movement of one of said calender-rolls toward the other, the lever 16 operated by the movement of said roll from the other, the lever 12 which is actuated by each of the said levers independently and controls the position of the striker-arresting device, a vertically movable part of the coiler, and the arm 20 which operates to move the striker-arresting device into range with the striker when the can becomes full, substantially as described.

4. The combination with a pair of calender-rolls, a striker, and a striker-arresting device, of a lever 10 operated by the movement of one of said calender-rolls toward the other, the lever 16 operated by the movement of said roll from the other, the lever 12 which is actuated by each of the said levers independently and controls the position of the striker-arresting device, a vertically movable part of the coiler, the arm 20 which operates to move the striker-arresting device into range with the striker when the can becomes full, and set-screws 18, 121, and 25 whereby to determine the extent of the movement of the movable calender-roll and said vertically movable part of the coiler which shall occasion engagement of the striker-arresting device with the striker, substantially as described.

5. The combination with a pair of calender-rolls, a movable bearing for one of the said calender-rolls, and a striker, of a lever 10 having one arm thereof extended into position to be engaged by the said bearing when the movable calender-roll approaches the other one, a lever 16 having one arm thereof extended into position to be engaged by the said bearing when the movable calender-roll recedes from the other one, a lever 12 acted upon by each of the levers 10 and 16 independently, and the arm 13 operated by the lever 12, substantially as described.

6. The combination with a pair of calender-rolls, a movable bearing for one of the said calender-rolls, and a striker, of a lever 10 having one arm thereof extended into position to be engaged by the said bearing when the movable calender-roll approaches the other one, a lever 16 having one arm thereof extended into position to be engaged by the said bearing when the movable calender-roll recedes from the other one, a lever 12 acted upon by each of the levers 10 and 16 independently, the set-screws 18 and 121 to regulate the action of said levers 10 and 16 and 12, and the arm 13 operated by the lever 12, substantially as described.

In testimony whereof I affix my signature in the presence of two witnesses.

WILLIAM P. CANNING.

Witnesses:
SAML. G. STEPHENS,
MARY CAVERLY.